United States Patent [19]

De With et al.

[11] Patent Number: 5,402,185
[45] Date of Patent: Mar. 28, 1995

[54] TELEVISION SYSTEM FOR TRANSMITTING DIGITIZED TELEVISION PICTURES FROM A TRANSMITTER TO A RECEIVER WHERE DIFFERENT TRANSFORM CODING TECHNIQUES ARE SELECTED ON THE DETERMINATION OF MOTION

[75] Inventors: Peter H. N. De With; Roeland Den Bakker, both of Eindhoven, Netherlands

[73] Assignee: U.S. Philips Corporation, New York, N.Y.

[21] Appl. No.: 278,711

[22] Filed: Jul. 22, 1994

Related U.S. Application Data

[63] Continuation of Ser. No. 968,612, Oct. 29, 1992, abandoned.

[30] Foreign Application Priority Data

Oct. 31, 1991 [EP] European Pat. Off. ............ 91202822

[51] Int. Cl.[6] ........................................... H04N 7/133
[52] U.S. Cl. ...................................... 348/407; 348/700
[58] Field of Search ............... 348/403, 407, 409, 415, 348/700; H04N 7/133

[56] References Cited

U.S. PATENT DOCUMENTS

| | | | |
|---|---|---|---|
| 4,903,124 | 2/1990 | Hoshi et al. | 348/422 |
| 5,005,076 | 4/1991 | Stroppina et al. | 348/400 |
| 5,089,888 | 2/1992 | Zoepski et al. | 348/405 |
| 5,089,889 | 2/1992 | Sugiyama | 348/415 |
| 5,168,357 | 12/1992 | Kutka | 348/403 |

FOREIGN PATENT DOCUMENTS 0260748 9/1987 European Pat. Off. .
0282135 3/1988 European Pat. Off. .

OTHER PUBLICATIONS

P. H. N. De With, "Motion-Adaptive Intraframe Transform Coding of Video Signals", Philips Journal of Research, vol. 44, No. 3/4, 1989 pp. 345-364.
S. M. C. Borgers et al., "An Experimental Digital VCR With 40 MM Drum, Single Actuator and DCT-Based Bit-Rate Reduction", IEEE Transaction on Consumer Electronics, vol. 34, No. 3, Aug. 1988, pp. 597-605.
W. K. Pratt, "Digital Image Processing", Wiley-Interscience Publication, 1978, pp. 232-278.

Primary Examiner—Howard W. Britton
Attorney, Agent, or Firm—Michael E. Marion

[57] ABSTRACT

A motion detector, particularly for use in a television system for transmitting television pictures in a digital form, is adapted to partition each picture into pixel blocks, to subject each pixel block to a modified intraframe transform for determining a first coefficient which corresponds to the basic picture having the lowest horizontal and highest vertical frequency, and to determine a plurality of further coefficients which correspond to basic pictures also having the lowest horizontal frequency, but a vertical frequency which is lower than that for the first coefficient. The motion detector signalizes the presence of motion within a pixel block if the first coefficient has a large absolute value, but if simultaneously none of the further coefficients has a sufficiently large absolute value. If the first coefficient has a sufficiently large absolute value, absence of motion is nevertheless signalized if simultaneously one of the further coefficients also has a sufficiently large absolute value.

2 Claims, 5 Drawing Sheets

```
┌─────────────────────────────────────────────────┐
│ p(21) p(22) p(23) p(24) p(25) p(26) p(27) p(28) │
│ p(41) p(42) p(43) p(44) p(45) p(46) p(47) p(48) │
│ p(61) p(62) p(63) p(64) p(65) p(66) p(67) p(68) │
│ p(81) p(82) p(83) p(84) p(85) p(86) p(87) p(88) │
└─────────────────────────────────────────────────┘ III
```

FIG. 4

I  II  III

FIG. 5

$$H = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

TELEVISION SYSTEM FOR TRANSMITTING DIGITIZED TELEVISION PICTURES FROM A TRANSMITTER TO A RECEIVER WHERE DIFFERENT TRANSFORM CODING TECHNIQUES ARE SELECTED ON THE DETERMINATION OF MOTION

This is a continuation of application Ser. No. 07/968,612, filed Oct. 29, 1992, now abandoned.

A. BACKGROUND OF THE INVENTION

A(1) Field of the Invention

The invention generally relates to a television system for transmitting television pictures in a digital form from a transmitter to a receiver. To limit the quantity of bits to be transmitted, each picture is subjected to a transform coding with different transforms, the transform to be performed being determined by the presence of motion effects between two consecutive fields of a frame.

The invention also relates to a motion detector for determining these motion effects.

It is to be noted that such a television system may be a television broadcasting system. In such a case a TV channel is used for transmitting the digitized television pictures.

Such a television system may alternatively be a video recorder, in which case the video tape is used for transmitting the digitized television signals.

A(2) Description of the Prior Art

As is generally known, a television picture is completely defined by three picture signals PS(1), PS(2), PS(3). These may be the three primary colour signals R, G, B, but alternatively a luminance signal Y and two colour difference signals CHR(1) and CHR(2) which are sometimes denoted by U and V, sometimes by I and Q, while many other designations are conventional.

For transmitting a television picture in a digital form, the television picture is considered to be a two-dimensional matrix of M rows (lines) each having N pixels (columns) and only the values associated with these $M \times N$ pixels of the three picture signals are transmitted to the receiver.

In a 625-line TV frame the visible part of the frame comprises 576 lines (rows) each having 720 pixels. If the associated luminance value for each pixel is represented by, for example an eight-bit code word, only the representation of all luminance values already requires approximately $3.10^6$ bits, i.e. a bit rate of approximately $75.10^6$ bits/sec in the case of 25 frames per second. This is inadmissibly high. The object envisaged by the researchers is to realise a bit rate of approximately 20 Mbit/sec, notably for recording digitized video signals on a magnetic tape or another storage medium.

To achieve this object, the series of television pictures is subjected to a transform operation (see for example References 1 and 2 in section C). The television picture to be coded is partitioned into a number of pixel blocks of $E \times E$ pixels each. A conventional value for E is eight so that a total number of 6480 pixel blocks is obtained with this partitioning. Each pixel block is subsequently considered to be a sum of $E^2$ mutually orthogonal basic pictures $B(i,k)$; $i,k = 1, \ldots E$ each basic picture being formed from the transform of its respective pixel block and each basic picture having its own weighting factor $y(i,k)$. These weighting factors are commonly referred to as coefficients. The indices i and k represent the spatial vertical and horizontal frequencies, respectively, in the basic picture (see Reference 3, chapter 10). Its significance will be apparent from the following. In the case of, for example, a discrete cosine transform, each pixel of the pixel block may assume a value between two extreme values. If these extreme values are white and black, respectively, each pixel may have a grey value. The associated grey values of the pixels succeeding one another in the vertical (or horizontal) direction are located on a curve which is cosine-shaped as a function of the location and is periodical with a period of $(2E-1)/i$. The reciprocal value of this period is referred to as the spatial frequency. In the case of, for example a Hadamard transform a pixel has either the one or the other value of two extreme values; in other words, it is either white or black. In this case i is a measure of the number of times of a jump from the one to the other extreme value, or conversely, in the series formed by the pixels succeeding one another in the vertical direction.

To transmit the coefficients at the lowest possible bit rate, they are subjected to an adaptive quantizing operation. A small step size is used for coefficients which are deemed to be significant, such as the dc coefficient $y(1,1)$ and the step size increases as the significance of a coefficient decreases. The different coefficients are thus represented by different numbers of bits. It is to be noted that many of the less significant coefficients become zero (of course dependent on their value) due to said quantizing operation and thus are not transmitted at all or are not transmitted individually.

In this way a bit rate reduction which is by all means interesting is realised with only a slight loss of picture quality. As has been extensively described in References 1 and 5, the loss of picture quality is found to be small in practice only when the pictures to be transformed are stationary pictures. To visualize this, one may imagine an object in the picture, which object is bounded by a vertically extending line. If the object (and hence this line) is moved horizontally, the parts of this line in the even field will be offset with respect to the parts of this line in the odd field. Since each frame comprises these two fields in an interlaced form, the originally straight line will be meandering. By subjecting this frame to a transform operation, it will be necessary to transmit more coefficients of a higher vertical frequency for a satisfactory representation of this meandering line. This has a detrimental influence on the coding efficiency. To improve this, it has been proposed in Reference 1 to partition each pixel block into an even and an odd field block of $E/2 \times E$ pixels each. The even field block comprises $E/2$ lines of the even field of the television picture and the odd field block comprises $E/2$ lines of the odd field of the television picture. Before subjecting a pixel block to a transform operation, it is first examined for motion effects. If these are not present, the entire pixel block is subjected to a transform operation which will be referred to as intraframe transform. If there are motion effects in the pixel block, the even and the odd field block are each and individually subjected to a transform operation. This will be referred to as intrafield transform.

Since such motion effects are not noticeable within a field, they will neither show if intrafield transform is used in such a case. In that case it is not necessary to consider more coefficients of higher vertical frequencies than would have been necessary if there had been a stationary picture which would have been subjected to an intraframe transform.

The decision whether the coefficients to be transmitted to the receiver are either those which are obtained from an intraframe transform or those which are obtained from an intrafield transform of the pixel block is made by a motion detector. An embodiment of such a detector is shown in References 1 and 5. In this embodiment a pixel block is subjected to an intraframe transform. More particularly, this is a modified two-dimensional Hadamard transform, but it may alternatively be any other modified transform, for example a Discrete Cosine Transform (DCT). The meandering line can now be represented by the basic picture having pictures representing the highest vertical and lowest horizontal frequency, i.e. by B(8,1) in the case of basic pictures derived from an 8×8 pixel block. This known motion detector now generates an indication of "motion" if the first coefficient y(8,0) associated with this basic picture B(8,1) and obtained by means of the modified two-dimensional Hadamard transform has a significant value which is, for example, larger than a predetermined reference value.

However, in practice this known motion detector regularly appears to take an erroneous decision in the sense that it indicates "motion", whereas there is no motion at all.

B. OBJECT AND SUMMARY OF THE INVENTION

It is an object of the invention to provide a modification of said motion detector in order to considerably reduce the risk of an erroneous decision.

According to the invention, the motion detector is therefore further adapted to determine a plurality of further coefficients for each pixel block by means of a modified transform, which coefficients are associated with basic pictures having a lower vertical frequency, and to generate an indication of "motion" only when, simultaneously with the occurrence of a significant value of the first coefficient, none of said further coefficients has a value of at least a predetermined significance.

In this respect a coefficient may be considered to be significant if it exceeds a predetermined reference value.

The above-defined condition is particularly satisfied if the first coefficient exceeds each of the further coefficients by at least a predetermined quantity.

The invention is the outcome of an extensive research study of the known motion detector. It appeared that erroneous decisions notably occur in situations in which the pixel block has one or more strong luminance transitions which extend throughout or substantially throughout the width of the pixel block. In these situations the first coefficient y(8,1) appears to have also a very significant value which thus results in an indication of "motion" without there really being any motion.

To be able to distinguish such a situation from a situation in which the pixel block does show motion effects, the researchers realised that such a transition is actually a step function and that it is known from the Fourier analysis that the low-frequency components have a larger value for such a step function than in other situations. In such a case high-frequency components only define the sharpness of the transition and most of these components usually have a considerably smaller value than the low-frequency components. This knowledge gave the researchers the means which enabled them to make a distinction between the two situations. In fact, if y(8,1) has a large value, whereas coefficients of a lower vertical frequency have a small value, it is very likely that the pixel block will show motion effects, in which case an indication of "motion" is generated. On the other hand, if y(8,1) has a large value, while coefficients of a lower vertical frequency also have a large value, it is very likely that the relevant pixel block does not show any motion effects but a strong transition of luminance, in which case an indication of "no motion" is generated.

C. REFERENCES

1. Television system in which digitalised picture signals subjected to a transform coding are transmitted from an encoding station to a decoding station; S. M. C. Borgers, R. P. de Bruijne, P. H. N. de With; European patent application no. 0 282 135.

2. An experimental digital VCR with 40 mm Drum, Single Actuator and DCT-based Bit-rate Reduction; S. M. C. Borgers, W. A. L. Heijnemans, E. de Niet, P. H. N. de With; IEEE Transactions on Consumer Electronics, Vol. 34, No. 3 August 1988, pages 697–705.

3. Digital Image Processing; W. K. Pratt; A Wiley-interscience publication, J. Wiley and Sons, (1978) (ISBN 0-471-01888-0) Chapter 10.

4. Verfahren und Schaltungsanordnung zur Bitratenreduktion, P. Vogel; European patent application no. 0 260 748.

5. Motion-adaptive intraframe transform coding of video signals; P. H. N. de With Philips Journal of Research Vol. 44, No. 3/4 1989.

E. DETAILED DESCRIPTION OF A PREFERRED EMBODIMENT

E(1) General Structure of the Television System

Figure 1:
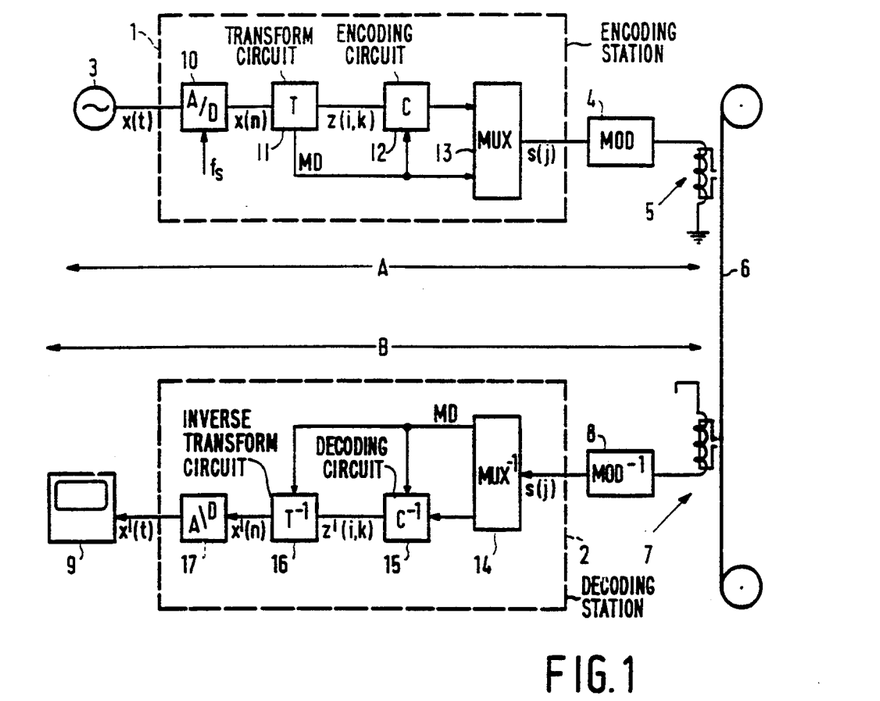
FIG. 1 shows diagrammatically a television system in the form of a video recorder.

FIG. 1 diagrammatically shows a television system, particularly a video recorder. It comprises a transmitter A and a receiver B. The transmitter comprises an encoding station 1 and the receiver comprises a decoding station 2. The encoding station receives an analog picture signal x(t) from a picture signal source 3 and supplies a pulse series s(j). The latter is suitably modulated in a modulation circuit 4 and recorded on a magnetic tape 6 via a write head 5. In the receiver B the information is read from the tape 6 by means of a read head 7 and converted into an electric signal which yields the pulse series s(j) again after demodulation in the demodulation circuit 8. This pulse series is applied to the decoding station 2 which supplies a local version x'(t) of the original picture signal x(t). This local picture signal x'(t) is applied to a monitor 9 for display.

In the encoding station 1 the analog picture signal x(t) is first sampled in an A/D converter 10 at a suitably chosen sampling frequency fs of approximately 13.5 MHz. These samples, which correspond to the previously mentioned pixels, are subsequently encoded in, for example, 8-bit PCM words x(n) and applied to a transform circuit 11 whose operation, though extensively described in Reference 1, will be further described. For the sake of completeness it is to be noted that transform circuit 11 converts each pixel block of $E \times E$ pixels x(i,k) of the picture into an equally large block of $E \times E$ coefficients z(i,k) and an indication bit MD. More particularly, each pixel block is subjected to an intrafield or an intraframe transform. The indication bit MD indicates to which of the two transforms the pixel block has been subjected. The coefficients and the indication bit MD are subsequently applied to an encoding circuit 12 which encodes the coefficient block in accordance with some algorithm, i.e. it converts the block into a series of code words. The number of code words in the series will usually be smaller than the number of coefficients in the coefficient block, while these code words usually have a variable length. A particularly suitable encoding algorithm is extensively described in Reference 4.

The encoded coefficients (the series of code words) and the indication bit MD may be written on the magnetic tape either individually or in a time-division multiplex format. In the latter case a time-division multiplex circuit 13 will be required which may be implemented in the conventional way and whose output supplies the pulse series s(j).

In the decoding station 2 the pulse series s(j) supplied by the demodulation circuit 8 is applied to a demultiplexing circuit 14 which separates the indication bit MD from the series of code words in this pulse series. This series of code words and the associated indication bit MD are applied separately to a decoding circuit 15 which supplies a coefficient block z'(i,k) for each series of code words, which block corresponds to the original coefficient block z(i,k). Together with the associated indication bit MD, this coefficient block is applied to an inverse transform circuit 16 which, dependent on the indication bit, subjects this coefficient block to an inverse intrafield or intraframe transform. As a result, it supplies the pixels x'(n) which are applied to a D/A converter 17 which supplies the analog picture signal x'(t) which can be displayed on monitor 9.

E(2) The Transform Circuit

As has been stated in section E(1), the transform circuit 11 is adapted to subject pixel blocks of $E \times E$ pixels to an intrafield or intraframe transform, dependent on the indication bit MD. An embodiment of such a transform circuit is shown diagrammatically in FIG. 2.

Figure 2:
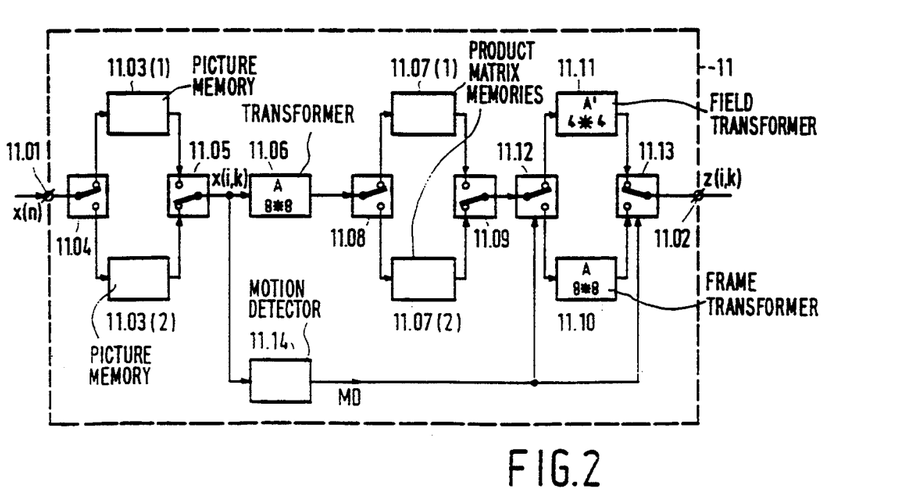
FIG. 2 shows diagrammatically a transform circuit.

This embodiment is based on the general idea that a pixel block of $E \times E$ pixels can be considered as the sum of $E^2$ mutually orthogonal basic pictures B(i,k) where i,k=1, 2, 3, . . . , each basic picture with its own weighting factor z(i,k), commonly referred to as coefficient. A pixel block will hereinafter be considered as a matrix X and a basic picture may also be considered as a matrix. More particularly each basic picture is mathematically defined by the following relation:

$$B(i,k) = A_i A^T_k \quad (1)$$

In this relation A represents a transform matrix; $A_i$ represents a matrix in which each column is equal to the i-th column of the transform matrix A and $A^T_k$ represents a matrix in which each column is equal to the k-th row of the matrix A. If the associated coefficients z(i,k) are also arrayed to a matrix Z, then it holds that $$Z = A^T X A \quad (2)$$

In this relation $A^T$ represents the transposed matrix of A.

For computing the coefficients in accordance with relation (2) both the original transform matrix A and its transposed version $A^T$ should be available. However, relation (2) is equivalent to:

$$Z^T = (XA)^T A \quad (3)$$

Only the transform matrix A is to be available for this matrix multiplication. More particularly, the product matrix XA may be computed first, subsequently this product matrix may be transposed and finally the transposed product matrix $(XA)^T$ may be multiplied again by the transform matrix A.

The embodiment shown in FIG. 2 has an input 11.01 to which the pixels x(n) are applied and an output 11.02 at which the coefficients z(i,k) occur. Two picture memories 11.03(1) and 11.03(2) are connected to the input 11.01. They have addressable memory locations and are controlled in such a way that the visible pixels of the visible lines of two consecutive fields of a frame are written in, for example, one of these picture memories, while the pixels of the two fields of a previous frame are read in the other picture memory. This alternate use of these two picture memories is symbolized by means of the two switches 11.04 and 11.05.

Figure 3:
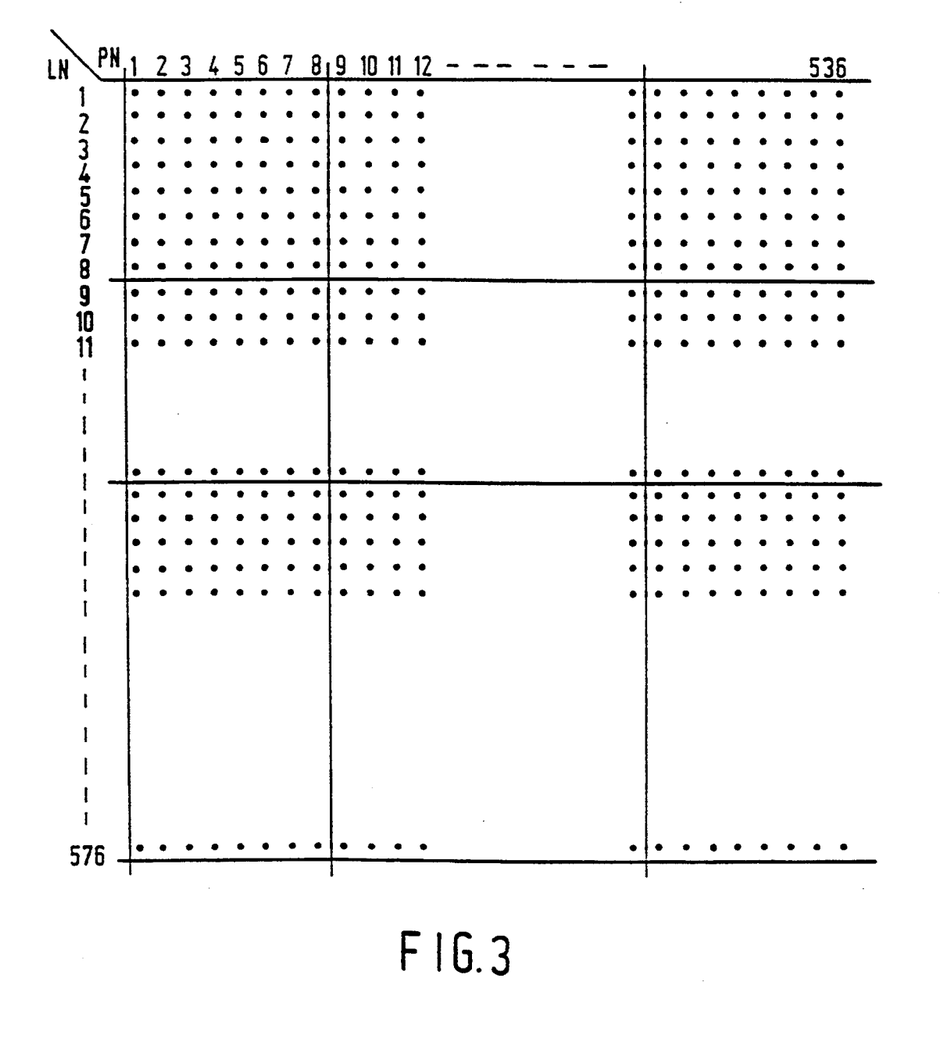
FIGS. 3 and 4 each show some diagrams to explain the operation of the transform circuit of FIG. 2.

More particularly picture lines are written in the picture memory line by line, first the odd lines and then the even lines. After all pixels of a frame have thus been read, the picture memory comprises, for example, the pixels illustrated by means of dots in FIG. 3. In this FIG. 3 also the row numbers LN of the picture memory in which pixels are written are shown in the vertical direction and the column numbers PN of the picture memory in which pixels are written are shown in the horizontal direction. When the contents of the picture memory are read, each picture is partitioned, as it were, into pixel blocks X of $E \times E$ pixels x(i,k). Such a partitioning is diagrammatically shown in FIG. 3 for E=8.

The pixels of such a block are applied row by row to a transformer 11.06. This block X is multiplied by the fixed transform matrix A which is preferably the 8-$\times$-8 discrete cosine matrix (DCT matrix). This yields the product matrix XA.

Two product matrix memories 11.07(1) and 11.07(2) are connected to the output of the transformer. Like the picture memories 11.03(.) they have addressable memory locations and are controlled in such a way that the product elements of the product matrix XA are written in one of these two product matrix memories, while the product elements of the previous product matrix are read in the other product matrix memory. More particularly, the product elements are written into such a memory row by row and read column by column. This alternate use of these two product matrices 11.07(.) is symbolized in FIG. 2 by means of the switches 11.08 and 11.09.

Each product matrix is subsequently subjected to either an intraframe transform or to an intrafield transform. To this end such a product matrix is applied either to the 8×8 frame transformer 11.10 or to the 4×4 field transformer 11.11. This selective operation is symbolized in FIG. 2 by means of the switches 11.12 and 11.13.

If the product matrix must be subjected to an intraframe transform, the product elements are read column by column from memory 11.07(.) so that the product matrix is transposed. The transposed 8×8 product matrix $(XA)^T$ thus obtained is multiplied again by the transform matrix A in transformer 11.10. As a result, the transposed coefficient matrix $Z^T = (XA)^T A$ is obtained. It is to be noted that the indication of intraframe transform arises from the fact that the product elements which are applied to transformer 11.10 have been produced from pixels of the two fields of the frame.

Figure 4:
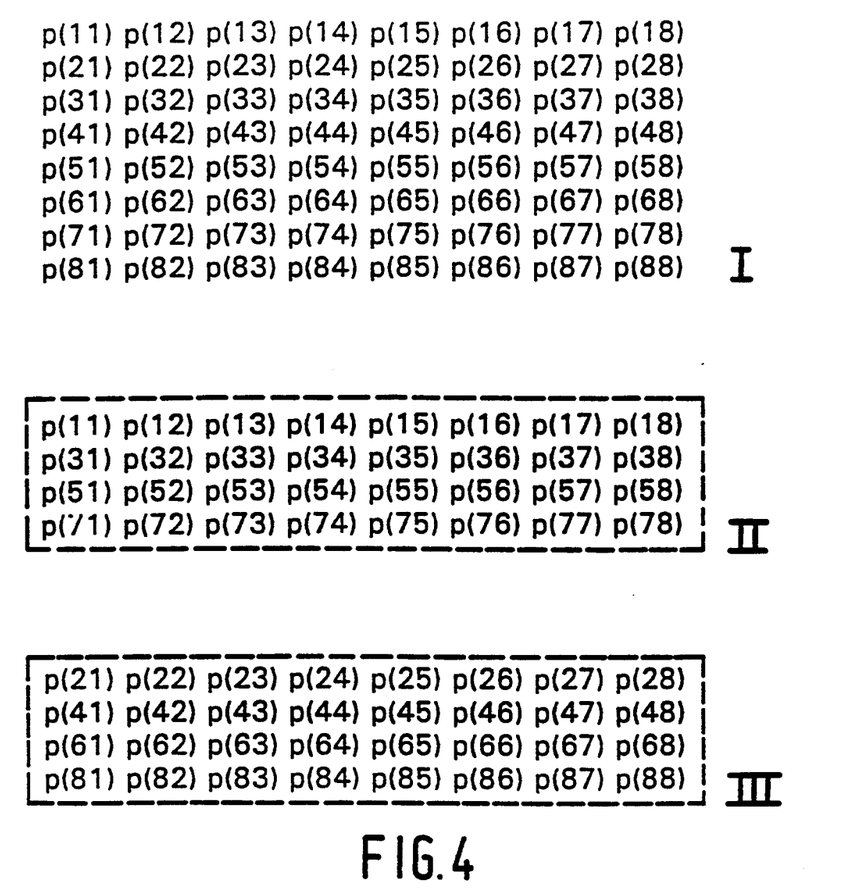

If the product matrix must be subjected to an intrafield transform, the product elements are read from the relevant product matrix memory 11.07(.) in a completely different sequence. More particularly, the product matrix is split up, as it were, in two parts. This is illustrated in FIG. 4. The entire product matrix of 8×8 product elements is denoted at I in FIG. 4, which elements are supplied by the transformer 11.06, and is stored in such a product matrix memory 11.07(.). Such a product element is denoted by p(i,k). This product matrix is now fictitiously first partitioned into a 4×8 sub-product matrix comprising the product elements of the odd lines as is denoted at II in FIG. 4 and a 4×8 sub-product matrix comprising the product elements of the even lines, as is denoted at III in FIG. 4. Subsequently these two 4×8 sub-product matrices are applied consecutively and column by column to the field transformer 11.11 with which a 4×4 transform matrix A' (DCT matrix) is now associated. Two groups of 32 coefficients each are obtained by multiplying each of the two 4×8 sub-product matrices by the 4×4 transform matrix A'. The indication of intrafield transform arises from the fact that the two fields of an 8×8 block are now separately subjected to a transform.

The intraframe or intrafield transform selection is based on the logical value of the indication bit MD which is supplied by a motion detector 11.14. In the embodiment shown this detector is connected to the input of transformer 11.06. It ascertains whether an object in the picture has moved in the period between two successive fields and whether anything of this movement is noticeable within a pixel block. If no movement is noticeable, MD becomes 0 and the pixel block is subjected to an intraframe transform. However, if a movement is noticeable, MD becomes 1 and the pixel block is subjected to an intrafield transform.

E(3) The Motion Detector

Figure 5:
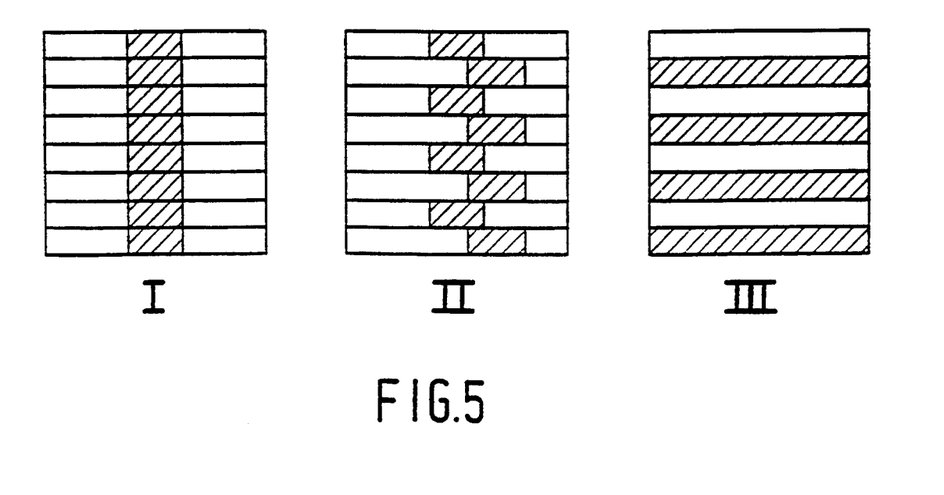
FIG. 5 shows some diagrams to explain the principle of the operation of a motion detector.
Figure 6:
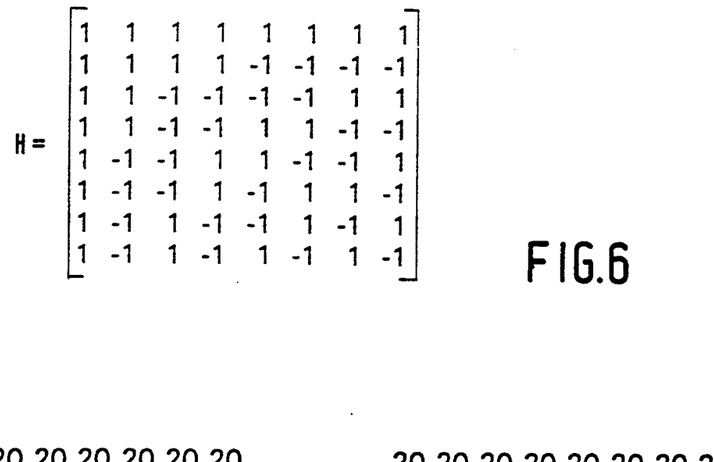
FIG. 6 shows a Hadamard matrix.

The general structure of the motion detector is based on a measurement of the vertical spatial frequency. The fact that this may be a measure of the presence of motion is shown in FIG. 5. A pixel block of the picture supplied by a video camera, if directed onto a vertically oriented object, for example, a tree trunk is shown at I in FIG. 5. If the camera significantly moves in the horizontal direction, a pixel element block of the line structure shown at II in FIG. 5 is produced. This line structure is produced because first the odd lines and then the even lines of the picture are scanned. Such a line structure is noticeable within a block of 8×8 pixels and part of this structure shows a great similarity to the basic picture H(8,1) which is shown at III in FIG. 5 and is associated with an 8×8 Hadamard transform matrix H. For the sake of completeness this 8×8 Hadamard matrix H is shown in FIG. 6 (see also the definition in relation (1)). To ascertain whether there are motion effects between two consecutive fields of a frame, it has already been proposed in Reference 5 to subject the block X of 8×8 pixels to a modified two-dimensional Hadamard transform for generating the coefficient y(8,1), and if this is larger than a given threshold value, to decide whether there is motion, leading to MD=1, or to MD=0 in the opposite case.

More particularly this modified two-dimensional Hadamard transform is defined as follows $$Y = \|H^T X\| H \qquad (4)$$

In this relation $\|H^T X\|$ represents a matrix each element b(i,k) of which is a modified version of the corresponding element p(i,k) in the product matrix $H^T X$. This modification may assume various forms. For example, b(i,k) may be equal to the absolute value of p(i,k) so that it holds that $b(i,k) = |p(i,k)|$. The choice may also be made for b(i,k) to be equal to the square of p(i,k), i.e. $b(i,k) = p^2(i,k)$. Without performing the full transform, the coefficient y(8,1) can be simply computed from, for example the relation $$y(8,1) = \sum_{k=1}^{8} \left| \sum_{i=1}^{8} (-1)^{i+1} x(i,k) \right| \qquad (5)$$

Figure 7:
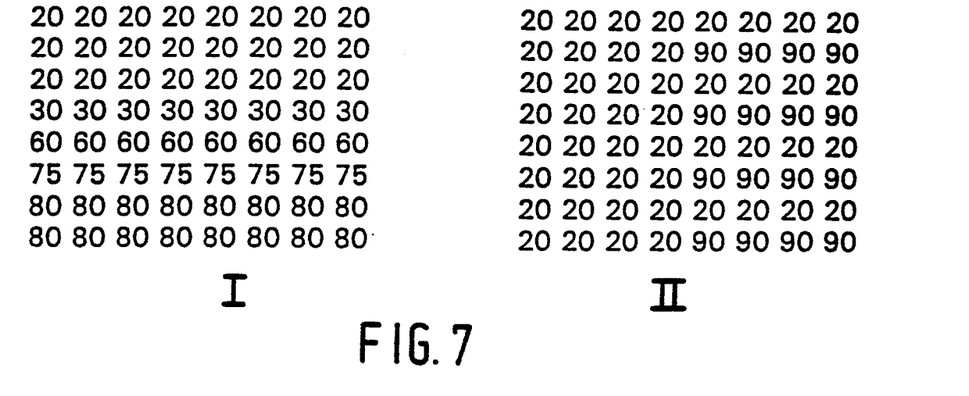
FIG. 7 shows the different luminance values of the composite pixels for two different pixel blocks.

However, as already stated, it appears that this motion detector regularly takes an erroneous decision in the sense that it incorrectly indicates the presence of motion (MD=1). Research has proved that this occurs in those situations in which the pixel block has one or more strong luminance transitions which extend throughout or substantially throughout the width of the block. To elucidate this, the luminance of each pixel of a pixel block is shown at I and II in FIG. 7. More particularly, the pixel block at I in FIG. 7 has a transition from dark (luminance 20) to light (luminance 80) which extends through three lines. This pixel block is further not influenced by motion effects. If this pixel block is subjected to the modified Hadamard transform, it can be deduced in a simple manner that y(8,1)=200. The pixel block shown at II in FIG. 7 is beset with motion effects and, while using the modified Hadamard transform again, it can be computed for this pixel block that y(8,1)=1120. Even if a threshold of 150 is chosen, this means that the pixel block at I in FIG. 7 incorrectly has the result that MD=1 (motion).

It is known from the Fourier analysis that such a transition as at I in FIG. 7 is described by large values of the low-frequency components. In such a case high-frequency components only define the sharpness of the transition and usually have a considerably smaller value than the low-frequency components. In other words, by computing also at least one low-frequency coefficient y(m,1) for a pixel block, it is possible to determine, dependent on the value of this coefficient, whether the relevant pixel block is one of the type shown at I in FIG. 7 (no motion, but a transition) or of the type shown at II in FIG. 7 (motion). For example, y(4,1) could be chosen as a low-frequency component, but another choice is also acceptable. A combination of two or more coefficients may alternatively be used, checking whether at least one of the coefficients exceeds a predetermined threshold. The implementation of such a motion detector is considerably simplified if a low-frequency coefficient is chosen which corresponds to the horizontal zero frequency.

Figure 8:
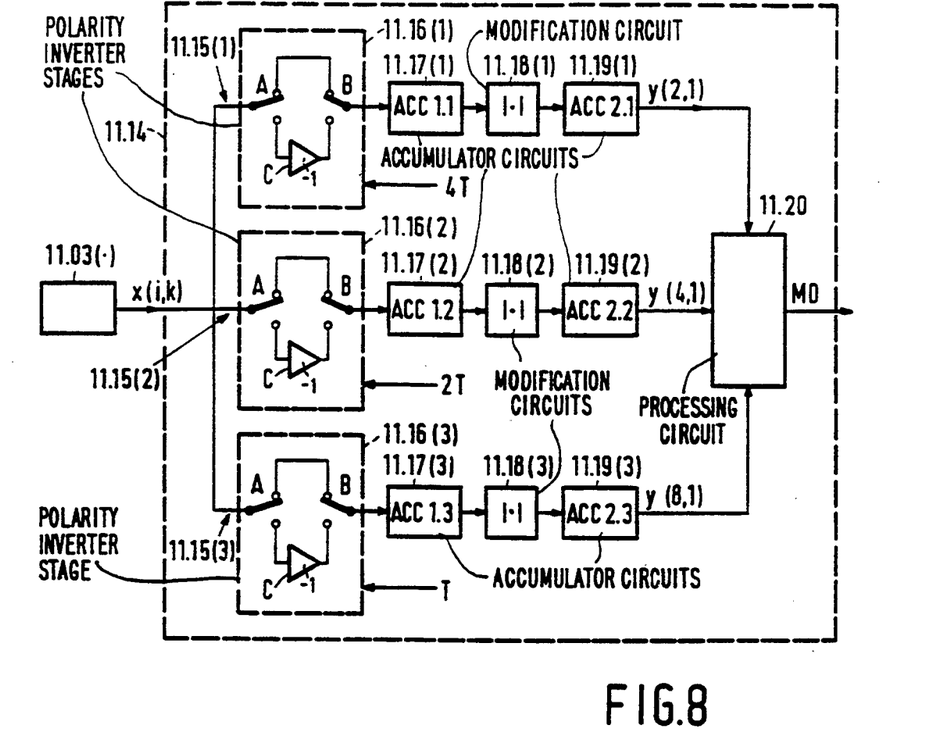
FIG. 8 shows an embodiment of a motion detector for use in the transform circuit of FIG. 2.

An embodiment of this motion detector is shown in FIG. 8. It is adapted to compute the coefficients y(2,1), y(4,1) and y(8,1) by means of the modified two-dimensional Hadamard transform and to take a decision of motion/no motion on the basis of their value.

After the pixels x(i,k) of a pixel block X have been applied row by row to transformer 11.06 (see FIG. 2), they are applied column by column to the motion detector 11.14. In this detector each pixel is applied to three channels 11.15(.) which are principally implemented in the same way. In such a channel 11.15(.) the pixel x(i,k) is first subjected to a selective polarity inversion. To this end each channel comprises a selective polarity inverter stage 11.16(.). Its operation is symbolized in the Figure by means of the two switches A and B and a multiplier circuit C having a multiplication factor of −1. The selective character of this inverter stage is realised by applying control pulses to such an inverter stage, which pulses can change the position of the switches A and B. More particularly, these control pulses occur with a period of 4T for the polarity inverter stage 11.16(1), with a period of 2T for the polarity inverter stage 11.16(2) and with a period of T for the polarity inverter stage 11.16(3). The value of T is the period at which the pixels are applied to the motion detector. More particularly the polarity of the first four pixels x(1,k), x(2,k), x(3,k) and x(4,k) of the eight pixels of column k of the pixel block X is not inverted in the selective polarity inverter stage 11.16(1), but the polarity of the four subsequent pixels x(5,k), x(6,k), x(7,k) and x(8,k) is inverted. In the selective polarity inverter stage 11.16(2) the polarity of the first two pixels x(1,k) and x(2,k) is not inverted, the polarity of the subsequent two pixels x(3,k) and x(4,k) is inverted, the polarity of the subsequent two pixels x(5,k) and x(6,k) is not inverted and finally, the polarity of the last two pixels x(7,k) and x(8,k) is inverted. Finally, the polarity of the consecutive pixels of a column are alternately inverted and not inverted in the selective polarity inverter stage 11.16(3).

The eight pixels of a column of the pixel block X whose polarity is thus inverted or not inverted are applied in each channel 11.15(.) to a first accumulator circuit 11.17(.) in which they are added together. The sum then obtained is applied to a modification circuit 11.18(.) which in this case takes the absolute value of this sum and applies it to a second accumulator circuit 11.19(.). Subsequently, the first accumulator circuit is reset and the pixels of the next column (k+1) of the pixel block X are applied to the motion detector. After all eight columns of the pixel block X have been processed in this manner, accumulator circuit 11.19(1) comprises the coefficient y(2,1), accumulator circuit 11.19(2) comprises the coefficient y(4,1) and accumulator circuit 11.19(3) comprises the coefficient y(8,1). These coefficients are now applied to a processing circuit 11.20 which supplies the motion indication bit MD. Subsequently, both the first and the second accumulator circuits 11.17(.) and 11.19(.) are reset so that the motion detector is ready again for processing the pixels of the next pixel block.

It is to be noted that the modification circuits 11.18(.) in this embodiment are adapted to pass on the absolute value of the sum in the first accumulator circuit 11.17(.) to the second accumulator circuit 11.19(.). As already noted, this modification circuit 11.18(.) may alternatively be adapted to square this sum and to apply this squared sum to the second accumulator circuit 11.19(.).

The processing circuit 11.20 may be implemented in different ways. Two embodiments will hereinafter be described in greater detail.

Figure 9:
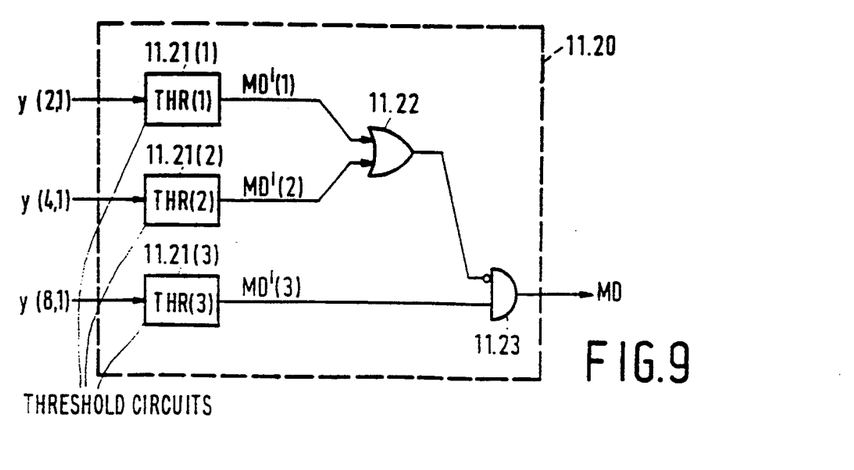
FIG. 9 shows a processing circuit for use in the motion detector of FIG. 8.

A first embodiment is shown in FIG. 9. It comprises three threshold circuits 11.21(.) each having their own threshold value THR(.) and receiving the coefficients y(2,1), y(4,1) and y(8,1), respectively. Whenever the received coefficient is larger than the threshold value with which it is compared, an auxiliary motion indication bit MD'(.)=1 is supplied. If the coefficient is smaller than the relevant threshold value, an auxiliary motion indication bit MD'(.)=0 is supplied. These auxiliary motion indication bits are applied in the manner as shown in the Figure to a logic circuit comprising an OR-gate 11.22 and an AND-gate 11.23 which receives the auxiliary motion indication bit MD'(3) directly and the logic output of OR-gate 11.22 via an inhibit input.

Figure 10:
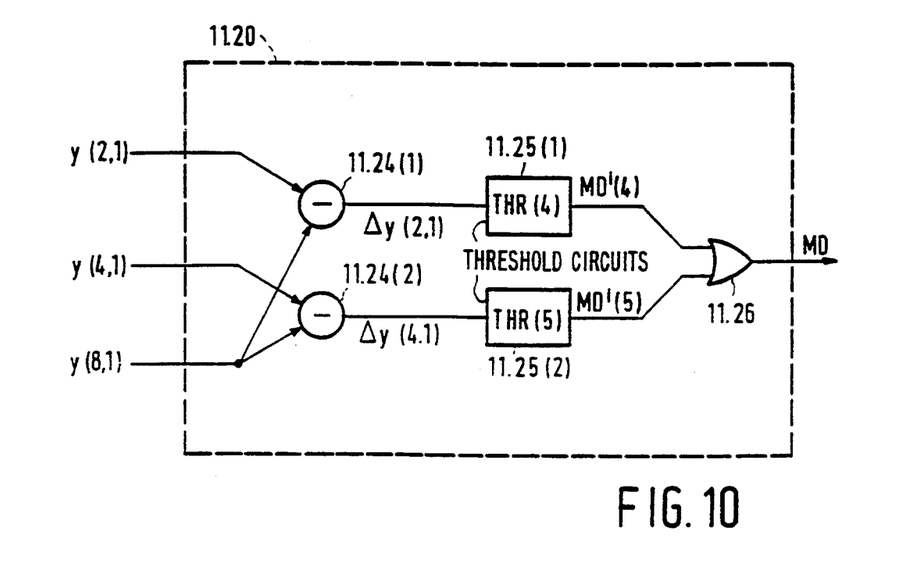
FIG. 10 shows a further embodiment of the processing circuit of FIG. 8.

A second embodiment of the processing circuit is shown in FIG. 10. It comprises two subtractors 11.24(.) which receive the coefficients in the way as is shown in the Figure for generating two difference coefficients by subtracting the absolute values of y(8,1) and y(4,1) on the one hand and the absolute values of y(8,1) and y(2,1) on the other hand. This leads to the difference coefficients $$\Delta y(4,1) = |y(8,1)| - |y(4,1)|$$

$$\Delta y(2,1) = |y(8,1)| - |y(3,1)| \tag{6}$$

By comparing the absolute value of each of these difference coefficients in threshold circuits 11.25(.) with an associated threshold value THR(4) and THR(5), auxiliary motion indication bits MD'(4) and MD'(5), respectively, are obtained which are applied to an OR-gate circuit 11.26 where they supply the indication bit MD.

It will be evident that, in designing the video recorder of FIG. 1, the designer may implement the motion detector in such a way that it computes only the coefficients y(8,1) and y(4,1) if in his opinion the coefficient y(4,1) only supplies sufficient information about the presence of the transition shown at I in FIG. 7.

As is apparent from these embodiments, the motion detector generally signalizes only "motion" when upon the occurrence of the coefficient y(8,1) which is larger than a first reference value none of the further coefficients is larger than a further reference value (which may be different for each further coefficient).

It is to be noted that this motion detector may alternatively be used in combination with other system configurations.

we claim:

1. An encoder for encoding a plurality of television pictures into a digital signal wherein each of said television pictures is formed by two fields and wherein each of said television pictures comprises a plurality of picture pixel blocks which in turn each comprise two field pixel blocks, said encoder comprising:

a) motion detection means for detecting an indication of motion occurring within a picture pixel block wherein said motion detection means further comprises means for determining whether a detected indication of motion is due to actual motion occurring within said picture pixel block in which case a motion detection signal is generated by said motion detection means, or to a transition in luminance within said picture pixel block without significant actual motion in which case said motion detection signal is not generated;

b) means, coupled to said motion detection means, for subjecting said picture pixel block to an intraframe transform operation so as to form a plurality of frame coefficients and for subjecting each field pixel block of said picture pixel block to an intrafield transform operation so as to form a plurality of field coefficients; and c) means, coupled to said motion detection means, for coding and transmitting said frame coefficients as said digital signal if said motion signal is not generated by said motion detection means and for coding and transmitting said field coefficients as said digital signal if said motion signal is generated by said motion detection means.

2. An encoder as defined in claim 1 wherein said motion detection means includes means for subjecting said picture pixel block to at least one further intraframe transform operation so as to form a high spatial frequency coefficient and a low spatial frequency coefficient and wherein said means for determining whether a detected indication of motion is due to actual motion or to a transition in luminance does said determining by comparing said low spatial frequency coefficient with said high spatial frequency coefficient.

* * * * *